(12) United States Patent
Chen et al.

(10) Patent No.: US 7,775,532 B2
(45) Date of Patent: Aug. 17, 2010

(54) STROLLER CONNECTABLE WITH A CAR SEAT

(75) Inventors: Shun-Min Chen, Taipei (TW); Jun-Xu Jin, Taipei (TW)

(73) Assignee: Wonderland Nurserygoods Co., Ltd. (TW)

( * ) Notice: Subject to any disclaimer, the term of this patent is extended or adjusted under 35 U.S.C. 154(b) by 359 days.

(21) Appl. No.: 11/746,368

(22) Filed: May 9, 2007

(65) Prior Publication Data

US 2008/0136127 A1 Jun. 12, 2008

(30) Foreign Application Priority Data

Dec. 6, 2006 (CN) .................... 2006 2 0165613 U

(51) Int. Cl.
B62B 7/04 (2006.01)
(52) U.S. Cl. ................ 280/47.4; 280/47.34; 280/47.38; 280/33.993
(58) Field of Classification Search ............ 280/33.993, 280/638, 639, 642, 647–650, 657, 47.131, 280/47.17, 47.18, 47.24, 47.25, 47.34, 47.38, 280/47.39, 47.4; 296/256.16, 250.1, 253
See application file for complete search history.

(56) References Cited

U.S. PATENT DOCUMENTS

| | | | | |
|---|---|---|---|---|
| 5,567,008 A | * | 10/1996 | Cone, II | 297/256.16 |
| 5,772,279 A | * | 6/1998 | Johnson, Jr. | 297/130 |
| 5,947,555 A | * | 9/1999 | Welsh et al. | 297/130 |
| 6,070,890 A | * | 6/2000 | Haut et al. | 280/47.38 |
| 6,390,560 B1 | * | 5/2002 | Gandhi et al. | 297/463.1 |
| 6,398,233 B1 | * | 6/2002 | Liang et al. | 280/30 |
| 6,572,134 B2 | * | 6/2003 | Barrett et al. | 280/650 |
| 6,702,316 B2 | * | 3/2004 | Hsia | 280/648 |
| 6,923,467 B2 | * | 8/2005 | Hsia | 280/648 |
| 7,278,652 B2 | * | 10/2007 | Riedl et al. | 280/642 |
| 2004/0124611 A1 | * | 7/2004 | Gong et al. | 280/642 |

* cited by examiner

*Primary Examiner*—S. Joseph Morano
*Assistant Examiner*—Vaughn T Coolman
(74) *Attorney, Agent, or Firm*—Ostrolenk Faber LLP

(57) ABSTRACT

A stroller is connected with a car seat, and includes a frame, a seat portion disposed on the frame, and a supporting member mounted to the seat portion. The supporting member is convertible between a supporting state where the supporting member stands on the seat portion, and a retracted state where the supporting member is disposed under the seat portion.

19 Claims, 12 Drawing Sheets

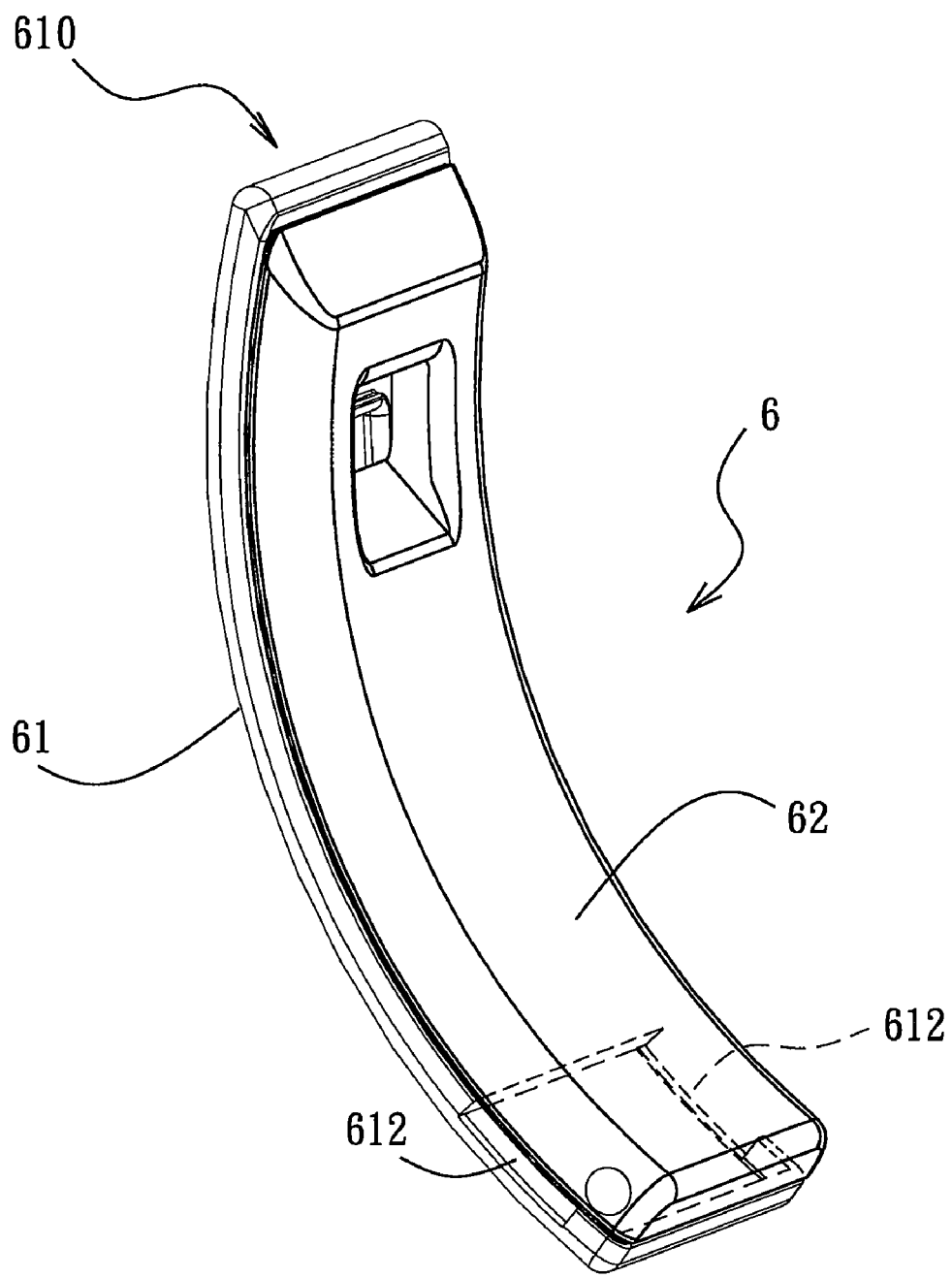
F I G. 9a

STROLLER CONNECTABLE WITH A CAR SEAT

CROSS-REFERENCE TO RELATED APPLICATION

This application claims priority of Chinese Application No. 200620165613.1, filed on Dec. 6, 2006.

BACKGROUND OF THE INVENTION

1. Field of the Invention

This invention relates to a stroller, and more particularly to a stroller connectable with a car seat.

2. Description of the Related Art

Current trends in stroller design are such that a specific portion of the stroller is made to allow a car seat to be connected therewith. Such a design can be found in U.S. Pat. Nos. 6,070,890, 5,947,555, and 6,572,134, and UP Patent Application Publication Number 2004/0124611.

In U.S. Pat. No. 6,070,890, a stroller is connected with a car seat by a tray. In UP Patent Application Publication Number 2004/0124611, a stroller is connected with a car seat by a pair of supporting rods. In U.S. Pat. No. 5,947,555, a stroller is connected with a car seat by two armrests.

SUMMARY OF THE INVENTION

The object of this invention is to provide a stroller that includes a supporting member that can be connected with a car seat and that forms a movable part of a stroller seat when the stroller is used independently (i.e., is not connected with the car seat).

According to an aspect of this invention, a stroller is adapted to be connected with a car seat, and comprises:

a frame;

a seat portion disposed on the frame; and a supporting member mounted to the seat portion and convertible between a supporting state where the supporting member stands on the seat portion, and a retracted state where the supporting member is disposed under the seat portion.

According to another aspect of this invention, a stroller assembly comprises:

a stroller including a frame and a stroller seat, the stroller seat having a seat portion; and a car seat including a seat body, and an engaging member disposed on a bottom portion of the seat body;

wherein the stroller further includes a supporting member mounted to the seat portion and having an engaging portion, the supporting member being convertible between a supporting state where the supporting member stands on the seat portion and wherein the engaging portion of the supporting member engages the retaining member of the car seat so as to retain the car seat on the stroller, and a retracted state where the supporting member is disposed under the seat portion.

BRIEF DESCRIPTION OF THE DRAWINGS

These and other features and advantages of this invention will become apparent in the following detailed description of the preferred embodiments of this invention, with reference to the accompanying drawings, in which:

FIG. 9a is a perspective view of an outer housing of the second preferred embodiment;

DETAILED DESCRIPTION OF THE PREFERRED EMBODIMENTS

Figure 1:
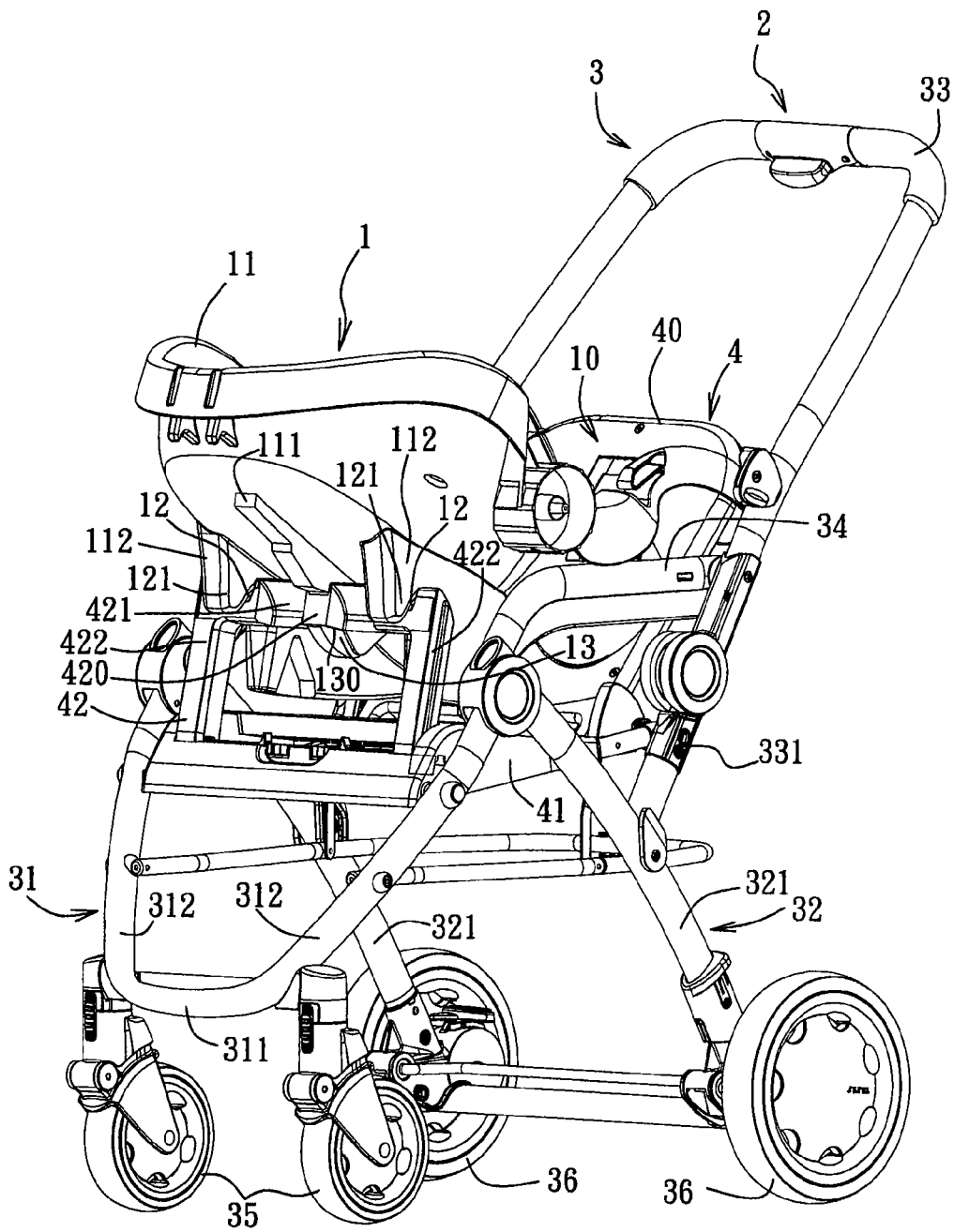
FIG. 1 is a perspective view of the first preferred embodiment of a stroller assembly according to this invention.
Figure 2:
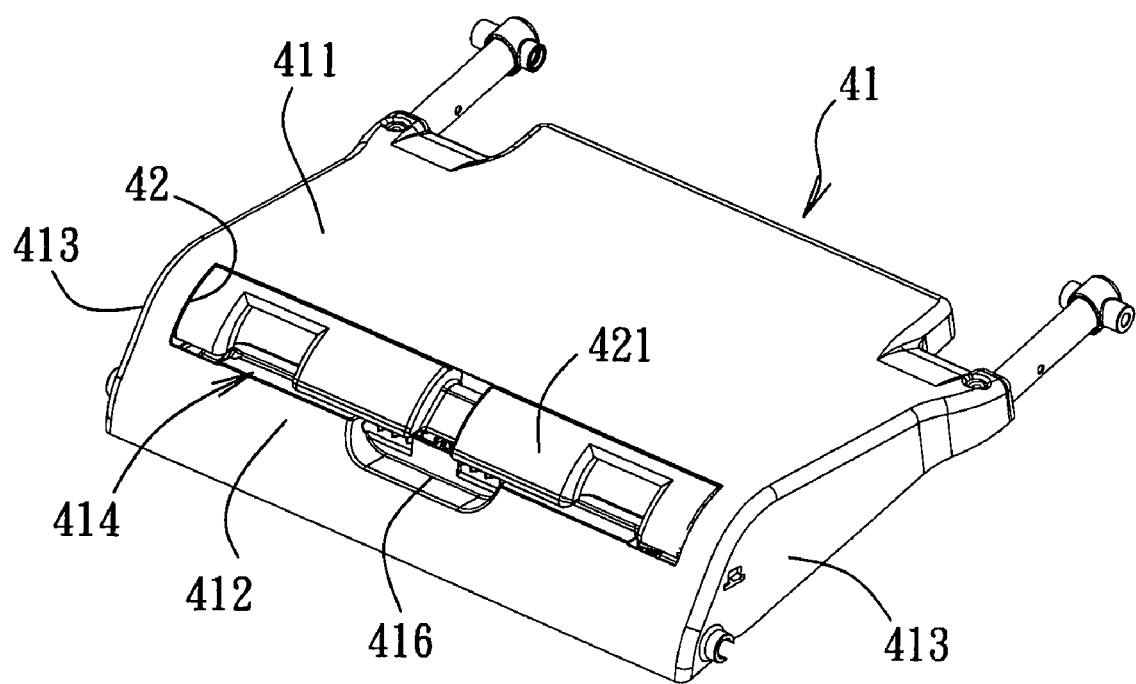
FIG. 2 is a fragmentary perspective view of the first preferred embodiment when a supporting member is in a retracted state.

Referring to FIGS. 1 and 2, the preferred embodiment of a stroller assembly according to this invention includes a car seat 1 and a stroller 2. The car seat 1 includes a seat body 11 and an engaging member disposed on the seat body 11. The seat body 11 has an accommodating space 10 for receiving a baby, and a bottom portion formed with a hollow middle ridge wall 111 and two side ridge walls 112 flanking the middle ridge wall 111. The engaging member includes a hook-shaped portion 13 disposed within the middle ridgewall 111. A hook groove 130 is defined between the hook-shaped portion 13 and the middle ridge wall 111. Each of the side ridge walls 112 is formed with a recess 12 aligned with the hook groove 130, and a stop block 121 defining a front end of the recess 12.

The stroller 2 includes a frame 3 and a stroller seat 4. The frame 3 includes a front leg frame 31, a rear leg frame 32, a back frame 33, two armrests 34, a pair of front wheels 35, and a pair of rear wheels 36. The front leg frame 31 is generally U-shaped, and includes a front leg rail 311 and two front legs 312 connected respectively to two ends of the front leg rail 311. The front wheels 35 are disposed respectively on bottom ends of the front legs 312. The rear leg frame 32 includes two rear legs 321 connected respectively and pivotally to top ends of the front legs 312, and a protective rail (not shown) interconnecting fixedly top ends of the rear legs 321. The protective rail may be a food tray or a protective bar (not shown). Alternatively, the protective rail may be connected removably to the rear legs 321. The rear wheels 36 are disposed respectively on bottom ends of the rear legs 321. The back frame 33 is inverted U-shaped, and has two bottom ends connected respectively and pivotally to two rear leg connecting rods 331 that are connected respectively and pivotally to the rear legs 321 at bottom ends thereof. The armrests 34 have front ends connected respectively and pivotally to top ends of the rear legs 321, and rear ends connected respectively and pivotally to two sides of the back frame 33.

Figure 3:
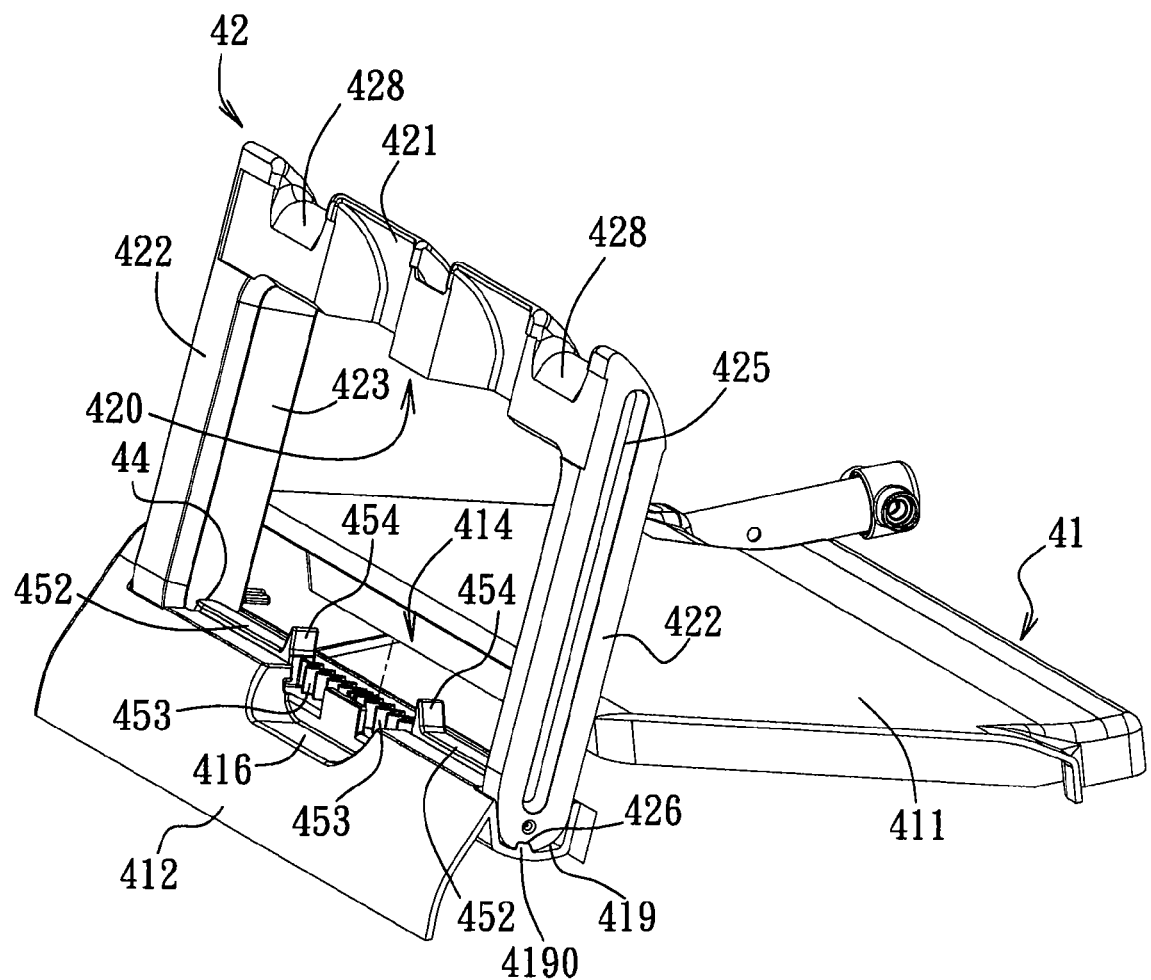
FIG. 3 is a fragmentary perspective view of the first preferred embodiment when the supporting member is in a supporting state.

The stroller seat 4 is disposed in a space defined by the front and the rear legs 312, 321 as well as the back frame 33. The stroller seat 4 includes a seat portion 41 disposed on the frame 3, a backrest 40, and a supporting member 42 disposed slidably on the seat portion 41. The backrest 40 is connected pivotally to a rear side of the seat portion 41. When the stroller 2 is not mounted with the car seat 1, the backrest 40 is pivotable between a greatest-angle position whereat a baby can lie on the seat portion 41 and the backrest 40, and a smallest-angle position whereat the baby can sit upright on the seat portion 41 and lean back against the backrest 40. When the backrest 40 is pivoted to the greatest-angle position, the car seat 1 can be mounted on the stroller 2. When independent use of the stroller 2 is desired (i.e., the stroller 2 is not connected with the car seat 1), the supporting member 42 is placed in a retracted state, as shown in FIG. 2. When it is desired to mount the car seat 1 to the stroller 2, the supporting member 42 is placed in a supporting state where interconnection between the stroller 2 and the car seat 1 is allowed, as shown in FIGS. 1 and 3.

Figure 5:
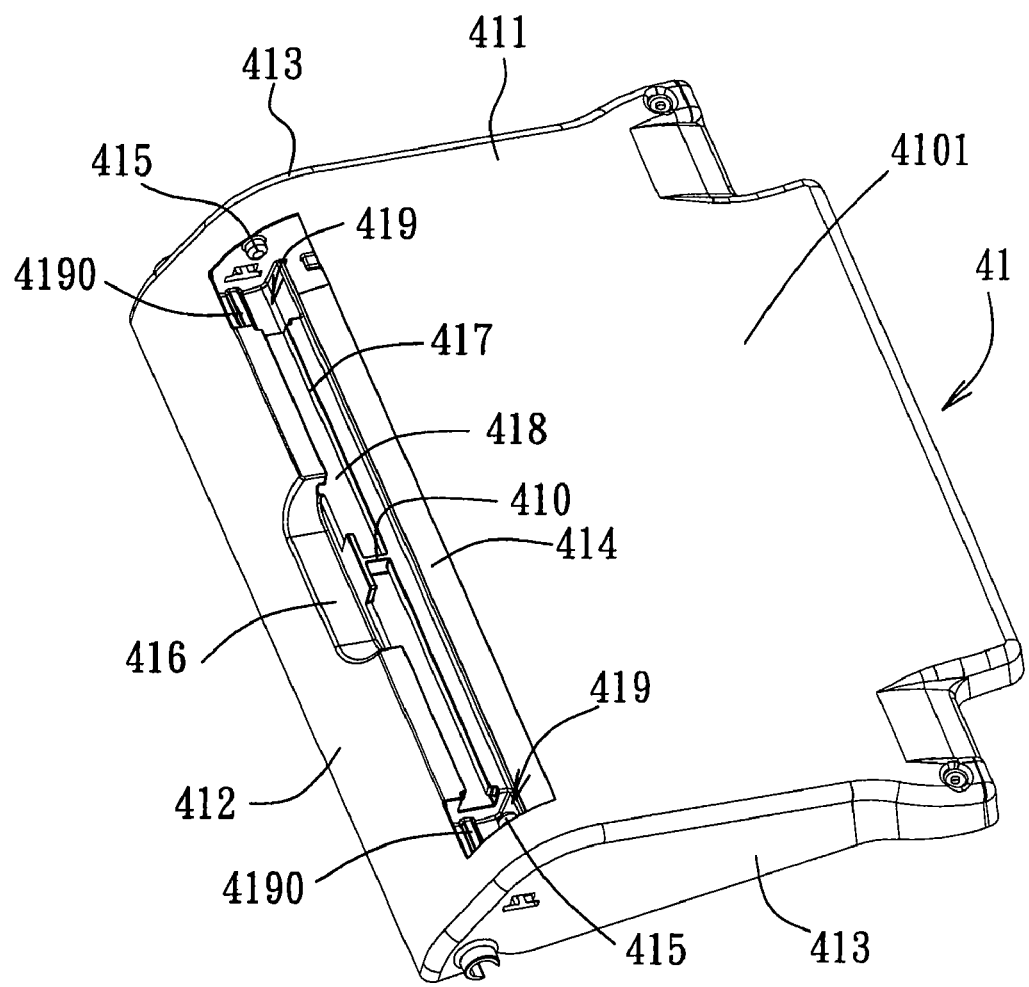
FIG. 5 is a perspective view of a seat portion of the first preferred embodiment.
Figure 6:
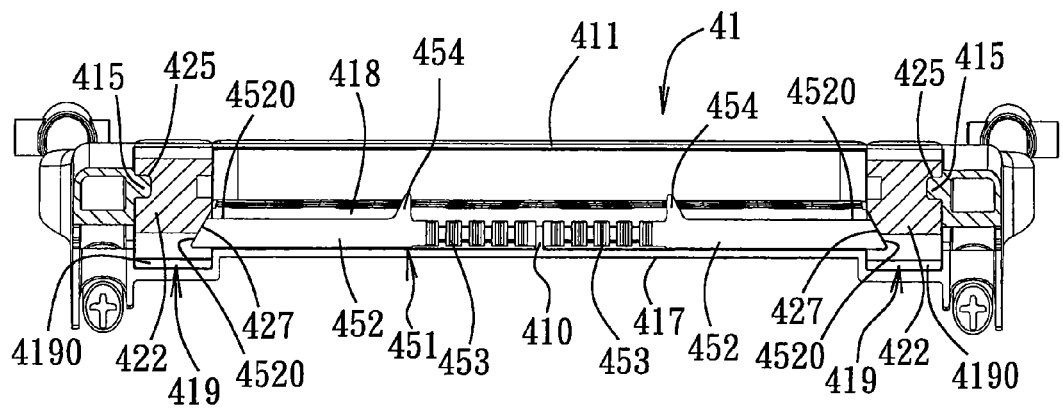
FIG. 6 is a fragmentary, partly sectional view of the first preferred embodiment when the supporting member is in the retracted state.

With further reference to FIG. 5, the seat portion 41 includes a seat plate 4101 and two spaced-apart side plates 413 extending respectively and downwardly from two opposite sides of the seat plate 4101. The seat plate 4101 has a top plate portion 411 and a curved front plate portion 412 extending forwardly and downwardly from a front end of the top plate portion 411 and connected to front ends of the side plates 413. The front and top plate portions 412, 411 define an elongated horizontal opening 414 therebetween. Each of the side plates 413 has an inner side surface formed with a guiding shaft 415 disposed in proximity to the opening 414. A wall defining a bottom side of the opening 414 is formed with a recess 416 such that the fingers of the user can move into the opening 414 therethrough. An elongated wall body 417 is connected fixedly to the front plate portion 412, and is disposed behind the front plate portion 412 and under the opening 414. Two ends of the elongated wall body 417 are connected respectively and integrally to the side plates 413, as shown in FIG. 6. The elongated wall body 417 is formed with an accommodating slot 418 and a partition 410 that is disposed in a middle portion of the accommodating slot 418 to thereby divide the accommodating slot 418 into two slot halves. Each of the slot halves has a positioning groove end 419 adjacent to the corresponding side plate 413 and deeper than the remaining portion thereof. The elongated wall body 417 is further formed with two positioning ribs 4190 at the positioning groove ends 419, respectively. In other words, the positioning ribs 4190 are disposed respectively in two opposite ends of the accommodating slot 418.

Figure 4:
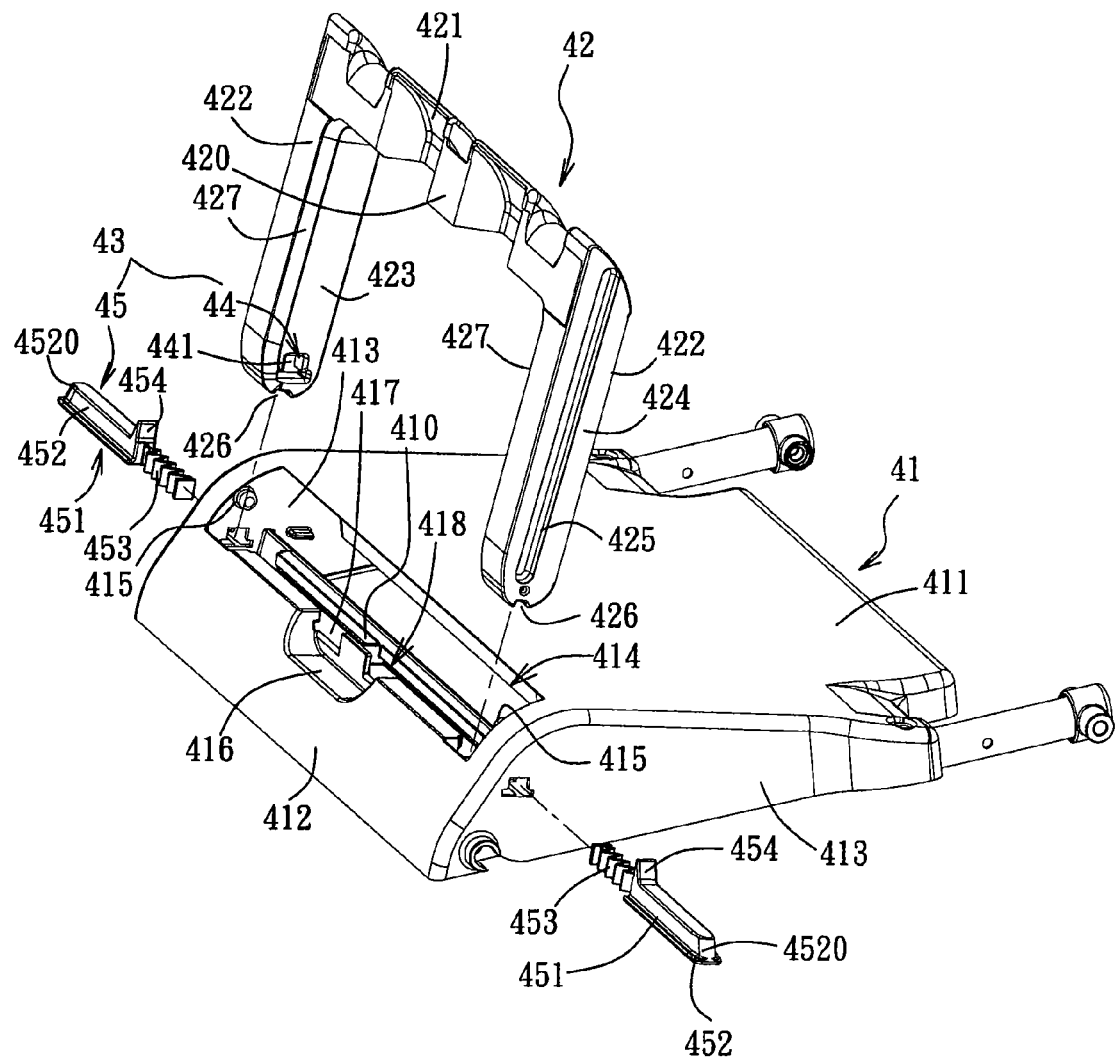
FIG. 4 is an exploded perspective view of the first preferred embodiment.

With additional reference to FIG. 4, the supporting member 42 is generally U-shaped, and includes a horizontal section 421 and two parallel guiding sections 422 extending respectively from two opposite ends of the horizontal section 421 in the same direction. The horizontal section 421 has an engaging portion 420 disposed at a middle portion thereof, and two recessed surfaces 428 disposed respectively at two end portions thereof. Each of the guiding sections 422 has an outer side surface 424 formed with a guide slot 425 that extends along a longitudinal direction thereof and that engages slidably the corresponding guiding shaft 415. As such, the supporting member 42 is disposed slidably on the seat portion 41, and can be pushed into or pulled out of the seat portion 41 through the opening 414. Each of the guiding sections 422 further has an end formed with a positioning cavity 426 engageable with the corresponding positioning rib 4190 in the positioning groove end 419, and an inner side surface 423 formed with an inclined guiding surface 427 along a periphery thereof.

The seat portion 41 further includes a retaining mechanism 43 that includes a first retaining unit 44 and a second retaining unit 45. In this embodiment, the first retaining unit 44 includes two retaining grooves 441 formed respectively in the inner side surfaces 423 of the guiding sections 422, and the second retaining unit 45 includes two retaining members 451 disposed respectively within the slot halves of the accommodating slot 418.

Figure 7:
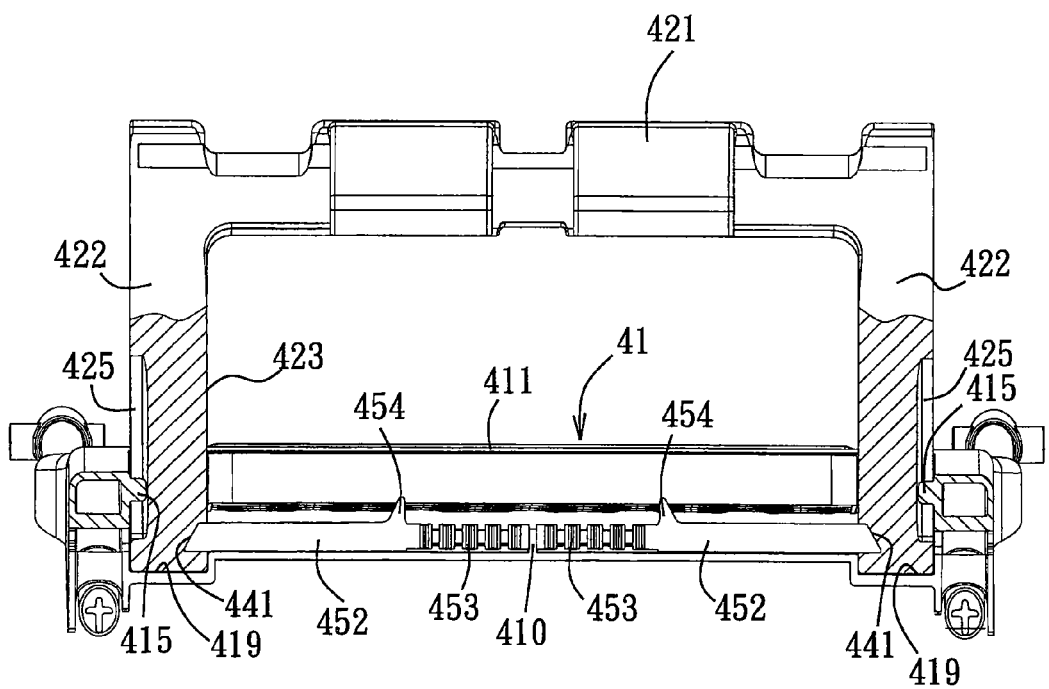
FIG. 7 is a fragmentary, partly sectional view of the first preferred embodiment when the supporting member is in the supporting state.

With additional reference to FIGS. 6 and 7, each of the retaining members 451 has a resilient section 453 configured as a plate extending in a meandering manner, an elongated retaining section 452 formed with an inclined surface 4520 at an end thereof adjacent to the corresponding side plate 413, and a push portion 454 projecting upwardly from an end of the retaining section 452 adjacent to the resilient section 453. Each of the resilient sections 453 has an end abutting against the partition 410. The retaining sections 452 are disposed respectively in the groove halves of the accommodating slot 418, and are biased respectively by the resilient sections 453 to move toward the inner side surfaces 423 of the guiding sections 422.

The horizontal section 421 of the supporting member 42 has an outer surface that is shaped such that, when the supporting member 42 is in the retracted state, it matches the top plate portion 411 or the front plate portion 412 of the seat plate 4101 so as to maintain a comfortable seating area for the baby sitting on the seat plate 4101. In this state, the supporting member 42 is disposed under the seat portion 41, the inclined guiding surfaces 427 of the guiding sections 422 abut respectively against the inclined surfaces 4520 of the retaining sections 452 of the retaining members 451, and the resilient sections 453 of the retaining members 451 are compressed, as shown in FIG. 6.

When it is desired to assemble the car seat 1 to the stroller 2, the supporting member 42 is pulled forwardly to project from the opening 414 until the guiding shafts 415 engage respectively rear ends of the guide slots 425. Subsequently, the supporting member 42 is pivoted upwardly and rearwardly about the guiding shafts 415 to a supporting position shown in FIG. 3. Hence, the supporting member 42 is converted into the supporting state, and stands on the seat portion 41. In this state, the guiding sections 422 are positioned respectively in the positioning groove ends 419, and the positioning ribs 4190 engage respectively the positioning cavities 426. In addition, the retaining members 451 are aligned respectively with the retaining grooves 441 in the inner side surfaces 423 of the guiding sections 422. Thus, the retaining sections 452 are biased respectively by the resilient sections 453 away from each other to engage the retaining grooves 441. As such, the supporting member 42 can be maintained in the supporting state.

Subsequent to the operation of the supporting member 42, the car seat 1 is placed into a space defined by the supporting member 42 and the armrests 34 such that the engaging portion 420 of the supporting member 42 engages the hook groove 130 in the hook-shaped portion 13. At the same time, the recessed surfaces 428 engage respectively the recesses 12, and abut respectively against the stop blocks 121, and two opposite sides of the seat body 11 abut respectively against the armrests 34.

When it is desired to remove the car seat 1 from the stroller 2, a downward pressure is applied to the hook-shaped portion 13 or an element (not shown) connected to the hook-shaped portion 13 so as to allow for rearward removal of the hook-shaped portion 13 from the horizontal section 421.

When it is desired to convert the supporting member 42 back into the retracted state, the push portions 454 are pushed toward each other against the biasing action of the resilient sections 453 so as to remove the retaining sections 452 from the retaining grooves 441 in the guiding sections 422, respectively. Subsequently, the supporting member 42 is pulled upwardly so as to remove the guiding sections 422 from the positioning groove ends 419, thereby separating the positioning ribs 4190 from the positioning cavities 426. Finally, the supporting member 42 is pivoted forwardly to a horizontal position, and is pushed rearwardly and converted into the retracted state, as shown in FIG. 2.

Figure 8:
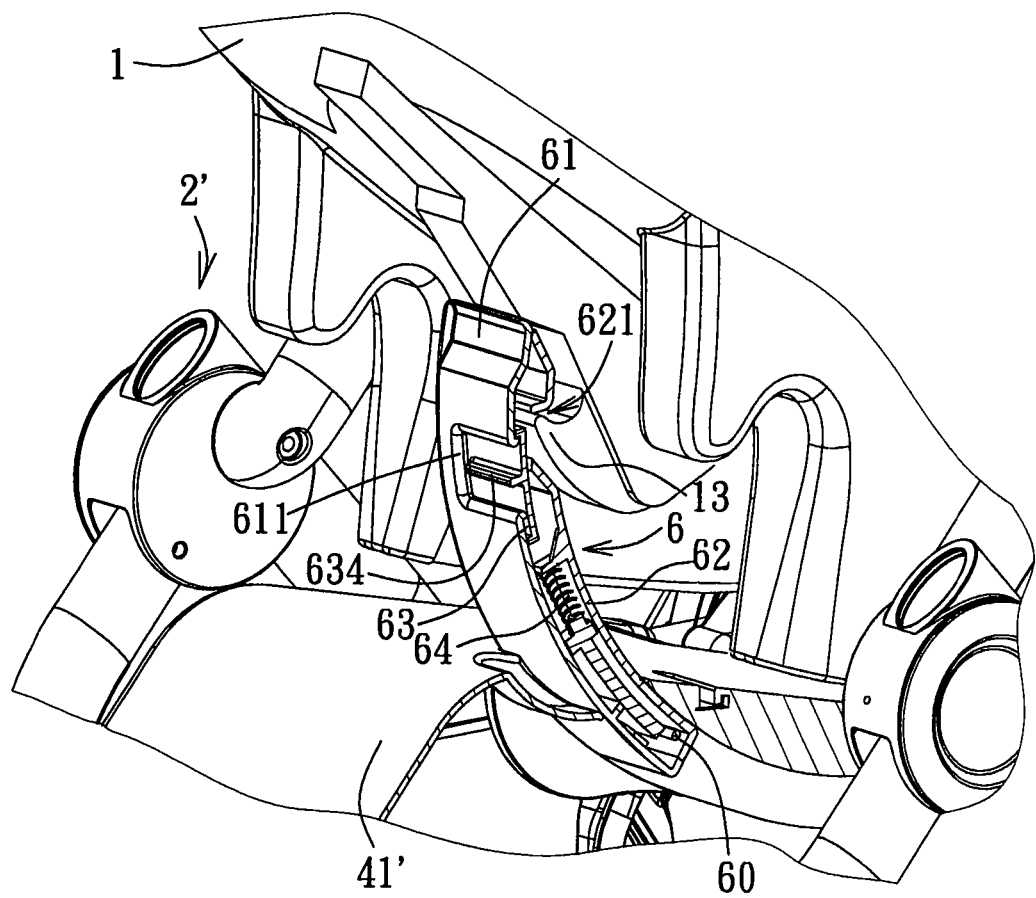
FIG. 8 is a fragmentary perspective view of the second preferred embodiment of a stroller assembly according to this invention.
Figure 9:
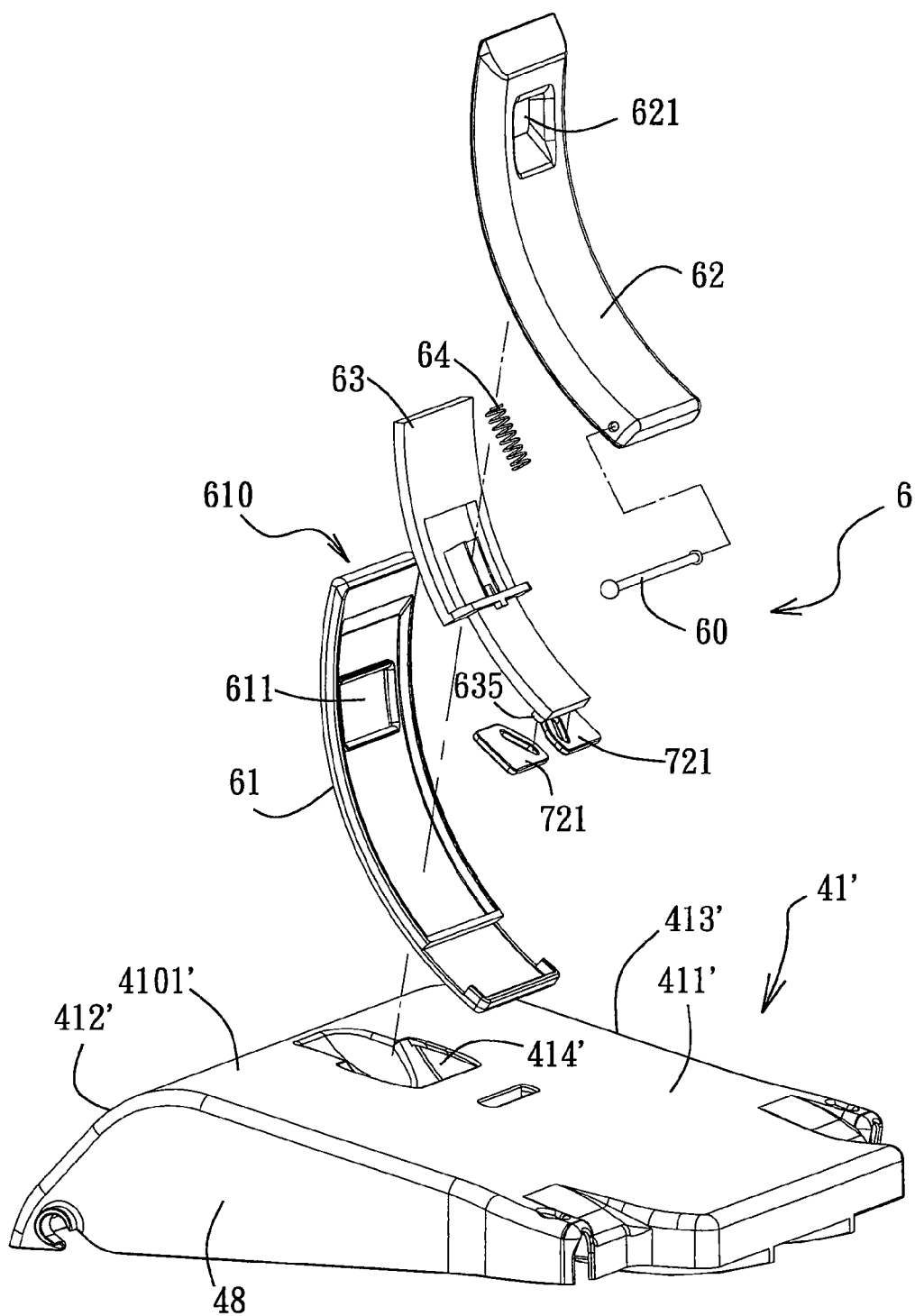
FIG. 9 is an exploded perspective view of a seat portion and a supporting member of the second preferred embodiment.

FIG. 8 shows the second preferred embodiment of a stroller assembly according to this invention, which is similar in construction to the first preferred embodiment except that the supporting member 6 is connected slidably to the seat portion 41' in a different manner.

With additional reference to FIGS. 9, 9A, 10, 11, and 12, in this embodiment, the seat portion 41' includes a seat plate 4101', two outer side plates 413' extending respectively and downwardly from two opposite sides of the seat plate 4101', and an opening 414' formed in the seat plate 4101'. The seat plate 4101' has a front plate portion 412', a top plate portion 411' connected to the front plate portion 412', and two side plate portions 48 extending downwardly from the top plate portion 411'. The opening 414' is formed in the top plate portion 411' between the side plate portions 48. The side plate portions 48 are formed respectively with two aligned curved slide slots 49.

The supporting member 6 is configured as a curved plate, and includes an outer housing 610, an actuator 63, and a resilient member 64. The resilient member 64 is configured as a coiled compression spring. The outer housing 610 includes a pair of front and rear covers 61, 62 each configured as a curved plate. The front cover 61 is formed with a front opening 611 adjacent to a top end thereof. The outer housing 610 has two side openings 612 formed respectively in two opposite sides thereof. Each of the side openings 612 is defined between the front and rear covers 61, 62. The rear cover 62 has an engaging portion adjacent to a top end thereof and configured as an opening 621. A sliding pin 60 extends through a bottom end of the rear cover 62, and engages slidably the slide slots 49 in the side plate portions 48. As such, the supporting member 6 is slidable on the seat portion 41' along the slide slots 49 in the side plate portions 48. The actuator 63 is disposed between the front and rear covers 61, 62, and is configured as an elongated upright plate. The actuator 63 includes a rectangular opening 630 having a bottom end that is defined by a wall 630', two spaced-apart projecting rods 635 formed on a front side surface of the actuator 63 and adjacent to a bottom end of the actuator 63, an actuating portion 634 projecting from the front side surface of the actuator 63 and adjacent to a top end of the actuator 63, a spring-positioning rod 632 extending upwardly from a middle portion of the wall 630', and two sidewalls 633 extending upwardly from the wall 630' and flanking the spring-positioning rod 632. The rear cover 62 has a front side surface formed with a stopper 622. The actuating portion 634 is aligned with and exposed within the front opening 611. The stopper 622 is disposed between the sidewalls 633. The resilient member 64 has a lower portion sleeved on the spring-positioning rod 632, and a top end abutting against the stopper 622.

In this embodiment, the first retaining unit 72 includes two retaining plates 721 disposed on the supporting member 6 and biased to project respectively from two opposite sides of the supporting member 6 through the side openings 612, respectively. The second retaining unit 71 includes two retaining holes 711 formed respectively through front end portions of the side plate portions 48, disposed immediately in front of the slide slots 49, respectively, and permitting insertion of the retaining plates 721, respectively.

The retaining plates 721 have inner ends adjacent to each other, and outer ends projecting respectively from two opposite sides of the outer housing 610. Each of the retaining plates 721 is formed with a downwardly and inwardly inclined slide slot 7210 adjacent to the inner end thereof. The projecting rods 635 extend respectively into the slide slots 7210 such that movement of the actuator 63 relative to the outer housing 610 results in movement of the projecting rods 635 within the slide slots 7210.

Figure 10:
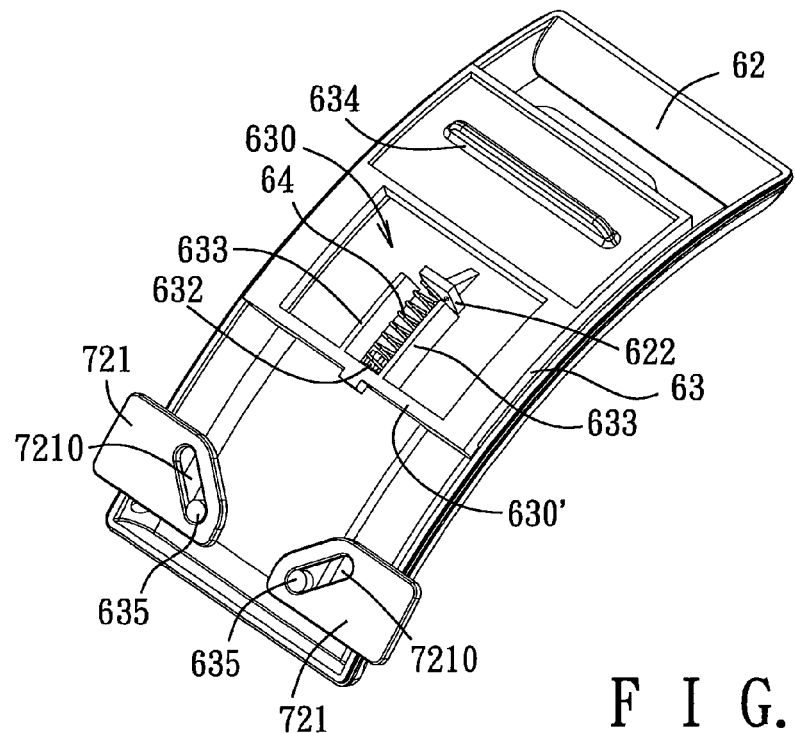
FIG. 10 is a perspective view of the supporting member of the second preferred embodiment, wherein a front cover is removed for best illustration.

With particular reference to FIG. 10, since the retaining plates 721 extend respectively through the side openings 612, when no force is applied to the actuator 63, the resilient member 64 urges the wall 630' to move downwardly from the stopper 622 so that the projecting rods 635 are located respectively within lower ends of the slide slots 7210. In this state, the retaining plates 721 project respectively from the sides of the outer housing 610.

Figure 11:
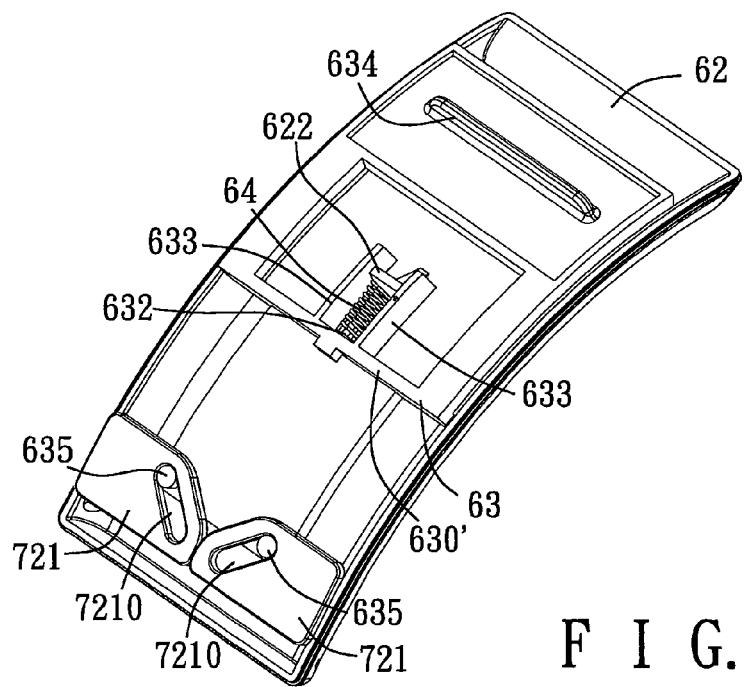
FIG. 11 is a perspective view similar to FIG. 10, illustrating how an actuator is moved upwardly relative to a rear cover so as to move two retaining plates toward each other.
Figure 12:
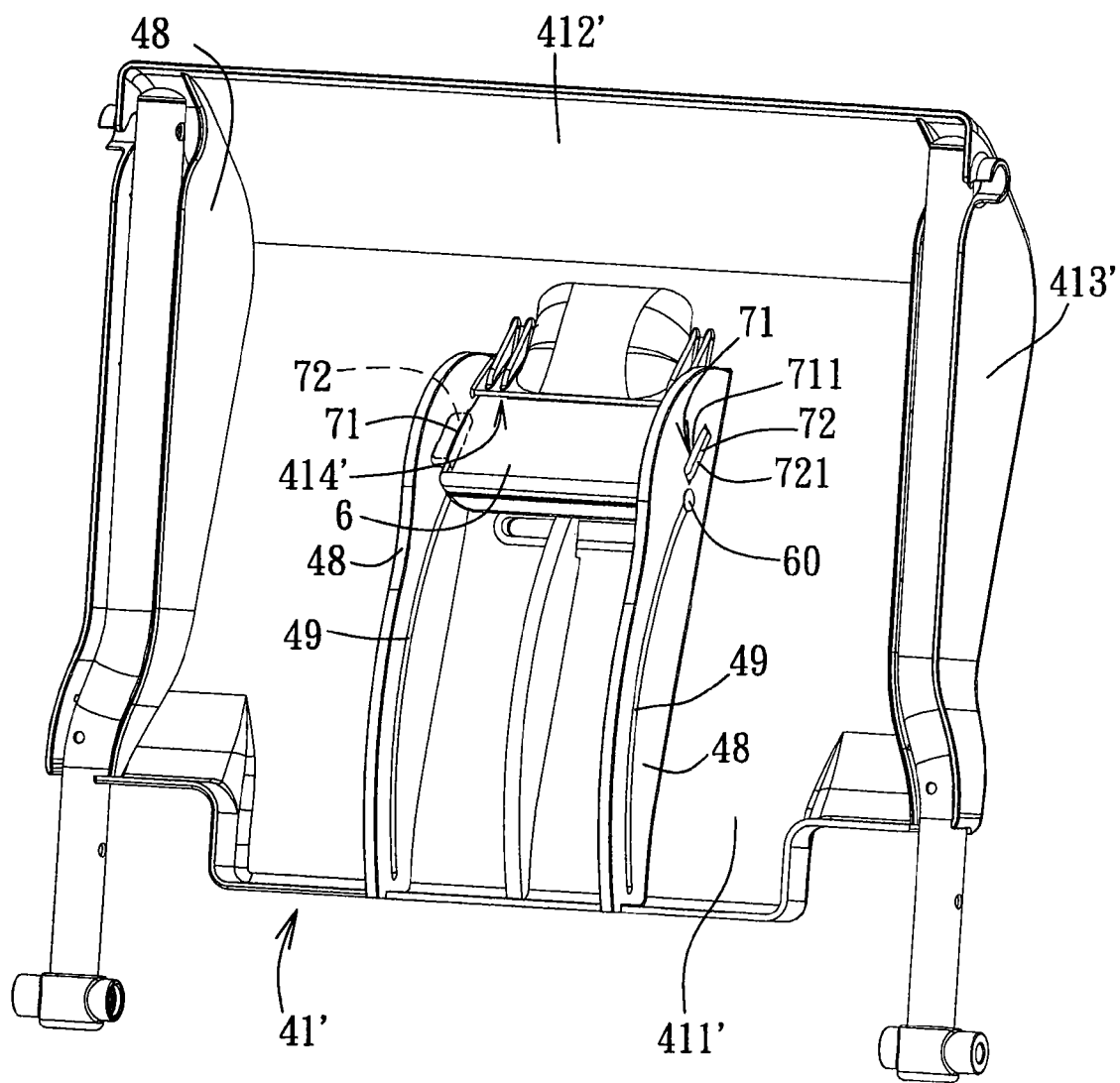
FIG. 12 is a fragmentary top perspective view of the second preferred embodiment when the supporting member is in a supporting state.

With particular reference to FIG. 11, when the actuating portion 634 of the actuator 63 is pulled upwardly against the biasing action of the resilient member 64, the actuator 63 is moved upwardly relative to the rear cover 62 so as to move the stopper 622 downwardly along a path defined by the sidewalls 633 until the projecting rods 635 move to upper ends of the slide slots 7210, respectively. Hence, the retaining plates 721 move toward each other. When the actuating portion 634 is released, the actuator 63 is biased by the resilient member 64 to return to the position shown in FIG. 10.

When it is desired to assemble the car seat 1 to the stroller 2', the supporting member 6 is pulled out of the seat portion 41' to a supporting position shown in FIG. 8. In the supporting position, the retaining plates 721 are aligned respectively with the retaining holes 711, and are biased by the resilient member 64 to engage respectively the retaining holes 711 so as to maintain the supporting member 6 in the supporting state. Thereafter, the hook-shaped portion 13 of the car seat 1 is inserted into the opening 621 in the rear cover 62 to thereby retain the car seat 1 on the stroller 2'.

Figure 13:
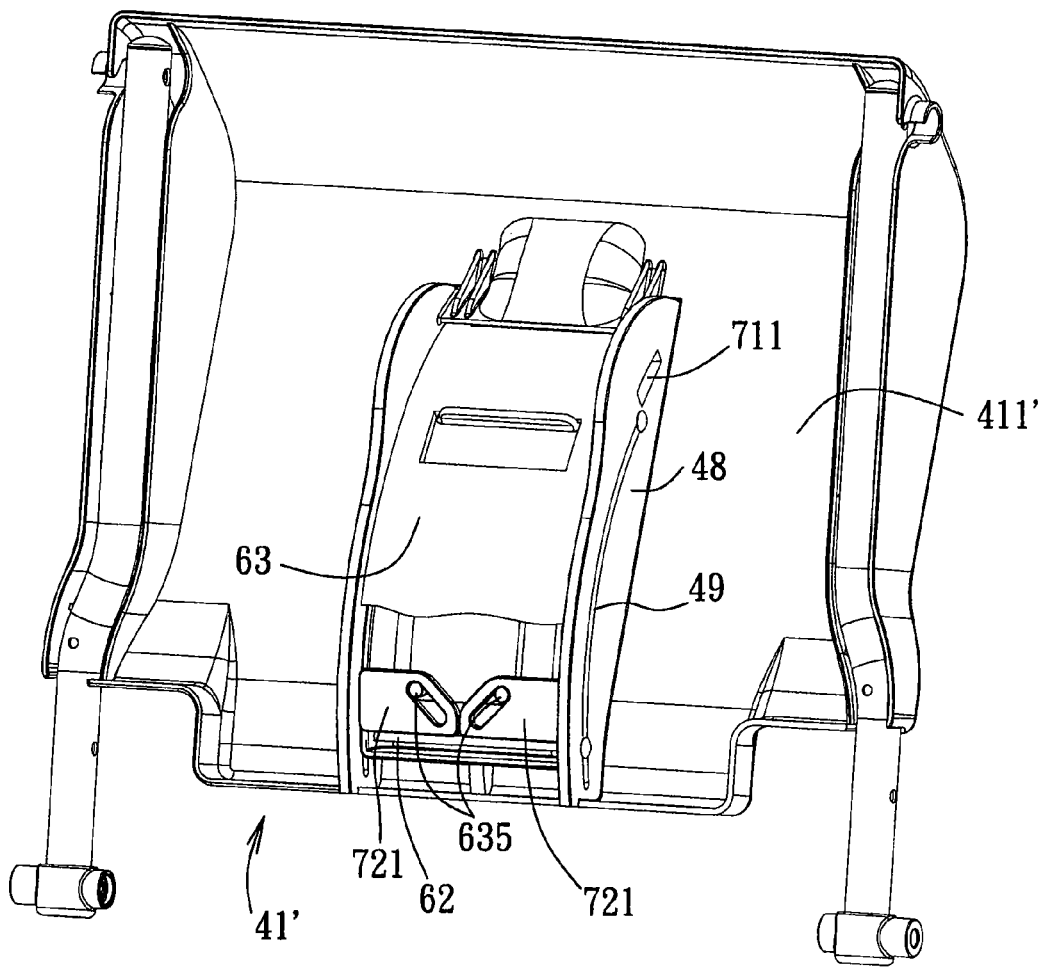
FIG. 13 is a fragmentary top perspective view of the second preferred embodiment when the supporting member is in a retracted state.

When it is desired to remove the car seat 1 from the stroller 2', a downward pressure is applied to the hook-shaped portion 13 or an element (not shown) connected to the hook-shaped portion 13 so as to allow for rearward removal of the hook-shaped portion 13 from the opening 621. Thereafter, the actuating portion 634 is moved upwardly to thereby remove the retaining plates 721 from the retaining holes 711, respectively. The supporting member 6 is pushed downwardly to a retracted position shown in FIG. 13. In the retracted position, the retaining members 721 abut against each other, and are disposed under the seat portion 41' between the side plate portions 48.

Alternatively, the supporting member 42, 6 may be disposed pivotally on a front end of the seat portion 41, 41' by a horizontal pivot pin (not shown) such that the supporting member 42, 6 can be pivotable between a supporting position whereat the supporting member 42, 6 stands on the seat portion 41, 41', and a retracted position whereat the supporting member 42, 6 is disposed under the seat portion 41, 41'.

With this invention thus explained, it is apparent that numerous modifications and variations can be made without departing from the scope and spirit of this invention. It is therefore intended that this invention be limited only as indicated by the appended claims.

We claim:

1. A stroller adapted to be connected with a car seat and comprising:
    a frame;
    a seat portion disposed on said frame;
    a supporting member mounted to said seat portion and convertible between a supporting state where said supporting member stands on said seat portion, and a retracted state where said supporting member is disposed under said seat portion; and
    a retaining mechanism that includes a first retaining unit disposed on said supporting member such that movement of said first retaining unit relative to the remaining portion of said supporting member is prevented, and a second retaining unit disposed on said seat portion such that, when said supporting member is in said supporting state, said first retaining unit engages said second retaining unit so as to maintain said supporting member in said supporting state.

2. The stroller as claimed in claim 1, wherein said first retaining unit includes two retaining plates biased to project respectively from two opposite sides of said supporting member, said second retaining unit including two retaining holes formed in said seat portion and aligned respectively with said retaining plates such that, when said supporting member is in said supporting state, said retaining plates engage respectively said retaining holes so as to maintain said supporting member in said supporting state.

3. The stroller as claimed in claim 2, wherein said supporting member includes:
    an outer housing having two opposite sides each formed with a side opening, said retaining plates extending respectively through said side openings;
    an actuator disposed movably within said outer housing; and
    a resilient member disposed between said outer housing and said actuator and biasing said retaining plates to move away from each other so as to engage said retaining holes, respectively.

4. The stroller as claimed in claim 3, wherein said actuator is configured as an elongated upright plate, and has a side surface formed with two spaced-apart projecting rods adjacent to a bottom end thereof, each of said retaining plates having opposite inner and outer ends, said inner ends being adjacent to each other, said outer ends being biased to project respectively from said sides of said outer housing, each of said retaining plates being formed with a downwardly and inwardly inclined slide slot adjacent to said inner end thereof, said projecting rods extending respectively into said slide slots such that movement of said actuator relative to said outer housing results in movement of said projecting rods within said slide slots.

5. The stroller as claimed in claim 3, wherein said outer housing includes a pair of front and rear covers each configured as a curved plate, said actuator being disposed between said front and rear covers, said actuator having an actuating portion adjacent to a top end thereof, said front cover being formed with a front opening aligned with said actuating portion such that said actuating portion is exposed within said front opening in said front cover so as to allow said actuator to be operated to move relative to said outer housing.

6. The stroller as claimed in claim 1, wherein said supporting member has two inner side surfaces facing each other, said first retaining unit includes two retaining grooves formed respectively in said inner side surfaces, said seat portion having a top plate portion and a front plate portion extending forwardly and downwardly from a front end of said top plate portion, said seat portion further including an accommodating slot disposed behind said front plate portion, said second retaining unit including two retaining members that are disposed within said accommodating slot and that are biased to engage respectively said retaining grooves when said supporting member is in said supporting state.

7. The stroller as claimed in claim 6, wherein each of said retaining members has a resilient section and a retaining section, said retaining sections being biased respectively by said resilient sections to move away from each other and toward said inner side surfaces of said supporting member, respectively, to engage said retaining grooves, respectively.

8. A stroller adapted to be connected with a car seat and comprising:
    a frame;
    a seat portion disposed on said frame;
    a supporting member mounted to said seat portion and adapted to connect with the car seat, wherein said support member is convertible between a supporting state where said supporting member extends upwardly from said seat portion, and a retracted state where said supporting member is substantially parallel to said seat portion; and
a retaining mechanism that includes a first retaining unit disposed on said supporting member such that movement of said first retaining unit relative to the remaining portion of said supporting member is prevented, and a second retaining unit disposed on said seat portion such that, when said supporting member is in said supporting state, said first retaining unit engages said second retaining unit so as to maintain said supporting member in said supporting state.

9. The stroller as claimed in claim 8, wherein said seat portion includes an opening, said support member being movable within said opening so that said support member is disposed under said seat portion when said supporting member is in said retracted state, said support member extending upwardly from said opening when said supporting member is in said supporting state.

10. The stroller as claimed in claim 8, wherein said supporting member is generally U-shaped and includes a horizontal section and two parallel guiding sections extending respectively from two opposite ends of said horizontal section, said horizontal section having an engaging portion adapted to engage with the car seat.

11. The stroller as claimed in claim 8, wherein said supporting member is configured as a curved plate, and includes an engaging portion disposed at a top end thereof and adapted to engage with the car seat.

12. A stroller adapted to be connected with a car seat and comprising:
    a frame;
    a seat portion disposed on said frame; and
    a supporting member mounted to said seat portion and convertible between a supporting state where said supporting member stands on said seat portion, and a retracted state where said supporting member is disposed under said seat portion;
    said seat portion includes a seat plate, and two spaced-apart side plates extending downwardly from said seat plate, said supporting member being disposed slidably between said side plates and operable to, initially, move forwardly relative to said seat portion and, subsequently, pivot upwardly and rearwardly relative to said seat portion until said supporting member stands on said seat portion; and said supporting member has two opposite outer side surfaces each formed with a guide slot, said seat portion further including two guiding shafts each extending from a respective one of said side plates into a respective one of said guide slots so as to allow for sliding movement of said supporting member on said seat portion.

13. A stroller assembly comprising:
a stroller including a frame and a stroller seat, said stroller seat having a seat portion;
a car seat including a seat body, and an engaging member disposed on a bottom portion of said seat body;
a supporting member mounted to said seat portion and having an engaging portion, said supporting member being convertible between a supporting state and a retracted state, said engaging portion of said supporting member engaging said engaging member of said car seat so as to retain said car seat on said stroller when said supporting member is in said supporting state; and
a retaining mechanism that includes a first retaining unit disposed on said supporting member such that movement of said first retaining unit relative to the remaining portion of said supporting member is prevented, and a second retaining unit disposed on said seat portion such that, when said supporting member is in said supporting state, said first retaining unit engages said second retaining unit so as to maintain said supporting member in said supporting state.

14. A stroller adapted to be connected with a car seat and comprising:
a frame;
a seat portion disposed on said frame; and
a supporting member mounted to said seat portion and convertible between a supporting state where said supporting member stands on said seat portion, and a retracted state where said supporting member is disposed under said seat portion; and
said supporting member includes a horizontal section and two parallel guiding sections extending respectively from two opposite ends of said horizontal section in the same direction, each of said guiding sections having an end formed with a positioning cavity, said seat portion further including two positioning ribs disposed respectively in two opposite ends of said accommodating slot, said positioning ribs engaging respectively said positioning cavities when said supporting member is in said supporting state.

15. A stroller assembly comprising:
a stroller including a frame and a stroller seat, said stroller seat having a seat portion; and
a car seat including a seat body, and an engaging member disposed on a bottom portion of said seat body;
wherein said stroller further includes a supporting member mounted to said seat portion and having an engaging portion, said supporting member being convertible between a supporting state and a retracted state, said engaging portion of said supporting member engaging said engaging member of said car seat so as to retain said car seat on said stroller when said supporting member is in said supporting state;
a retaining mechanism that includes a first retaining unit disposed on said supporting member such that movement of said first retaining unit relative to the remaining portion of said supporting member is prevented, and a second retaining unit disposed on said seat portion such that, when said supporting member is in said supporting state, said first retaining unit engages said second retaining unit so as to maintain said supporting member in said supporting state; and
said engaging member of said seat body has a hook-shaped portion defining a hook groove, said supporting member having an engaging portion that engages said hook groove in said engaging member.

16. The stroller as claimed in claim 15, wherein said supporting member is configured as a curved plate, said engaging portion being configured as an opening formed in said supporting member, said hook-shaped portion of said engaging member of said seat body being inserted into said opening to thereby retain said car seat on said stroller.

17. A stroller assembly comprising:
a stroller including a frame and a stroller seat, said stroller seat having a seat portion; and
a car seat including a seat body, and an engaging member disposed on a bottom portion of said seat body;
wherein said stroller further includes a supporting member mounted to said seat portion and having an engaging portion, said supporting member being convertible between a supporting state and a retracted state, said engaging portion of said supporting member engaging said engaging member of said car seat so as to retain said car seat on said stroller when said supporting member is in said supporting state; and
said engaging member of said seat body has a hook-shaped portion defining a hook groove, said supporting member having an engaging portion that engages said hook groove in said engaging member; and
said car seat includes two recesses, and two stop blocks defining respectively front ends of said recesses, said supporting member having two recessed surfaces that engage respectively said recesses in said car seat and that abut respectively against said stop blocks.

18. A stroller adapted to be connected with a car seat and comprising:
a frame;
a seat portion disposed on said frame; and
a supporting member mounted to said seat portion and convertible between a supporting state where said supporting member stands on said seat portion, and a retracted state where said supporting member is disposed under said seat portion; and
said seat portion includes a seat plate, and two spaced-apart side plates extending downwardly from said seat plate, said supporting member being disposed slidably between said side plates and operable to, initially, move forwardly relative to said seat portion and, subsequently, pivot upwardly and rearwardly relative to said seat portion until said supporting member stands on said seat portion.

19. The stroller as claimed in claim 18, wherein said seat portion further includes an opening formed in said seat plate and disposed between said side plates, said supporting member being movable within said opening so as to be converted between said supporting state and said retracted state.

* * * * *